US006991664B2

(12) United States Patent
Riehmann et al.

(10) Patent No.: US 6,991,664 B2

(45) Date of Patent: Jan. 31, 2006

(54) INTAKE SYSTEM

(75) Inventors: Jens Riehmann, Stuttgart (DE); Martin Rieber, Stuttgart (DE); Heinz Hettmann, Schorndorf (DE); Heiko Rosskamp, Adelberg (DE)

(73) Assignee: Andreas Stihl AG & Co. KG, (DE)

( * ) Notice: Subject to any disclaimer, the term of this patent is extended or adjusted under 35 U.S.C. 154(b) by 0 days.

(21) Appl. No.: 10/632,999

(22) Filed: Aug. 1, 2003

(65) Prior Publication Data

US 2004/0094114 A1 May 20, 2004

(30) Foreign Application Priority Data

Aug. 5, 2002 (DE) ................................ 102 35 761

(51) Int. Cl.

*B01D 50/00* (2006.01)
*B01D 45/12* (2006.01)

(52) U.S. Cl. ............................ 55/321; 55/337; 55/347; 55/349; 55/428; 55/430; 55/437; 55/459.1; 55/DIG. 28; 123/198 E; 123/41.65

(58) Field of Classification Search .................. 55/321, 55/347, 348, 349, 337, 430, 459.1, 428, 437, 55/DIG. 28; 123/41.65, 198 E See application file for complete search history.

(56) References Cited

U.S. PATENT DOCUMENTS

| | | | | |
|---|---|---|---|---|
| 2,424,572 A * | 7/1947 | Lincoln | 55/348 |
| 3,877,454 A * | 4/1975 | Axmann et al. | 123/198 E |
| 4,537,608 A * | 8/1985 | Koslow | 55/337 |
| 4,746,340 A * | 5/1988 | Durre et al. | 55/347 |
| 6,681,726 B2 * | 1/2004 | Linsbauer et al. | 123/41.65 |
| 2004/0231633 A1 * | 11/2004 | Uhl et al. | 123/198 E |

FOREIGN PATENT DOCUMENTS

| | | |
|---|---|---|
| DE | 25 50 165 C3 | 8/1978 |
| GB | 920230 | 3/1963 |
| GB | 933 936 | 8/1963 |
| GB | 1 464 407 | 2/1977 |
| GB | 2 199 267 | 7/1988 |

* cited by examiner

*Primary Examiner*—Robert A. Hopkins
(74) *Attorney, Agent, or Firm*—Robert W Becker & Associates; Robert W Becker

(57) ABSTRACT

An intake system for the combustion air of a motor of a hand held implement is provided. The system includes an air filter and a centrifugal separator. The air filter has a dirt chamber and a clean chamber that is separated therefrom by a filter medium. The clean chamber is fluidically connected with a carburetor of the motor to convey combustion air to the motor. The centrifugal separator splits the air stream into a core flow having low particle density and a peripheral flow having high particle density. The centrifugal separator includes at least two cyclones, wherein the discharged flows from the cyclones are respectively combined in pairs and open out into a common suction tube.

20 Claims, 6 Drawing Sheets

INTAKE SYSTEM

BACKGROUND OF THE INVENTION

The invention relates to a suction or intake system for the combustion air of the motor of a hand-held power tool, especially a disc cutter or cut-off machine.

An intake system for the motor of a hover lawnmower is known from patent specification DE 25 50 165 C3 and has a centrifugal separator. Pre-cleaned air is delivered from the core flow of the centrifugal separator to the air filter disposed downstream of the centrifugal separator.

The underlying objective of the invention is to propose an intake suction system of the aforementioned general type, which is efficient at sucking up dirt and can be readily integrated in a portable power tool.

SUMMARY OF THE INVENTION

This objective is inventively realized by an intake system having an air filter with a dirt chamber and a clean chamber that is separated from the dirt chamber by a filter medium, wherein the dirt chamber is fluidically connected with the carburetor of the motor; a centrifugal separator that splits an incoming air stream into core flows having a low particle density, and peripheral flows having a high particle density, wherein one of the flows is conveyed to the dirt chamber of the air filter, and the other of the flows is discharged, wherein the centrifugal separator includes at least two cyclones, and wherein discharge flows from the cyclones are respectively combined in pairs; and a suction tube, wherein the paired discharge flows open out into the suction tube.

The discharged airflows are fed into a common suction tube. This saves on mounting space compared with a system where a separate suction tube is provided for every cyclone. At the same time, fewer components are needed. However, using the common suction tube does mean that suction paths from the individual cyclones will necessarily be of differing lengths. When the airflows are remerged with one another, significant pressure differences are generated as a result, which can considerably reduce the suction power and hence the separating efficiency. In order to guarantee that dirt is sucked away efficiently, a system is therefore proposed whereby the airflows from the cyclones are merged again in respective pairs. Remerging the airflows in respective pairs reduces the resultant pressure differences. As a result, the same vacuum pressure and mass flow can be obtained at every cyclone.

The intake system advantageously has a dirt collector with a dirt collection chamber into which the part-flows are fed. In particular, the dirt collection chamber has passages, in which the part-flows are merged. Efficient dirt suction can be achieved if a part-flow is fed out of a cyclone through a discharge spiral. Manufacture is facilitated if the discharge spirals from the cyclones are designed as an integral part of the dirt collector. In order to ensure efficient dirt suction in all the cyclones, the cross section and the length of the passages are selected so that approximately the same vacuum pressure prevails in the discharge spirals of all cyclones. This ensures that the same mass flow is fed through each passage. In this respect, the choice of cross section relative to the length of every passage is decisive. The distribution of pressure across the passages can be controlled by means of the cross section. A simple layout of passages is obtained by providing a dividing wall between two passages in the dirt collection chamber. The dividing wall may be designed as an integral part of the dirt collector.

For practical purposes, the dirt collection chamber has a flow-connection to the peripheral flow leaving the cyclones, which has a high particle density. At least one cyclone advantageously has an immersion tube, provided on the end of the main body remote from the intake element, through which the core flow leaves the cyclone. In particular, the immersion tubes for all cyclones are provided as an integral part of the dirt collector. This therefore dispenses with the need for any other separate components. The fact that the immersion tubes are an integral part of the dirt collector makes for a compact construction. The dirt collection chamber in the dirt collector advantageously extends substantially transversely to the longitudinal axis of the cyclone.

Every cyclone advantageously has a main body with an intake element adjoining it. The intake element is specifically provided as a separate part. The intake element can therefore be manufactured separately. This duly simplifies the component geometries to be manufactured. Particularly in the case of centrifugal separators made from plastic, production can be simplified by using an injection molding process. However, it may also be of advantage to make the intake element as an integral part of the main body. To make the centrifugal separator easy to retrofit in existing housings, it is proposed that the centrifugal separator should have at least two, in particular at least three, cyclones. This enables a sufficient throughput of combustion air to be generated without the need for a large contiguous construction volume. In order to obtain efficient intake, the intake element has an inlet funnel.

The intake element is advantageously joined to the main body in a snap-fit connection. This makes for a simple assembly system. In particular, a catch connection is provided between intake element and main body. The intake elements may also be fixed onto the main body by additional means, such as welding for example. The number of parts is kept low if the intake elements for all cyclones are of an identical design. This makes production and warehouse storage less complex. However, it may also be expedient to design the intake elements as an integral part of the main bodies of the cyclones. The number of parts needed can also be reduced if the air filter is disposed in an air filter housing and the main bodies of the cyclones constitute a common component in conjunction with a first housing part of the air filter housing. This enables the cyclones to be produced in a single process step together with the air filter housing. This is easily done by providing the intake elements separately and manufacturing them by an injection molding process in particular. One particularly advantageous embodiment can be obtained by incorporating the dirt chamber of the air filter in the first housing part of the air filter housing.

For the purpose of emptying the dirt collection chamber, the intake system incorporates a fan and a suction tube, in which case the suction tube provides a flow connection between the dirt collection chamber and the bladed rear face of the fan directed towards the motor. To this end, the suction tube is arranged on a suction side of the fan in particular and therefore sucks the dirt and debris which has accumulated in the dirt collection chamber, together with the airflow, out of the dirt collection chamber. For practical purposes, the cross section of the suction tube becomes larger towards the fan. This produces conducive flow conditions, thereby obtaining efficient suction. The suction tube opens in particular in the region of the rotation axis of the fan.

In order to prevent dirt from accumulating in the suction tube, the suction tube approximately coincides with the direction of gravitational force when the power tool is in the normal operating position. A particularly conducive arrangement is one in which the dirt collection chamber is disposed above the air filter by reference to the direction of gravitational force when the power tool is in the normal operating position. The dirt collector is specifically attached to a housing part of the air filter housing, in particular to the first housing part. The dirt chamber of the air filter is specifically closed off from the outside environment by an air filter cover. This being the case, the air filter cover expediently locates in a sealing groove provided on the first housing part of the air filter housing. It is of a continuous and flat design to ensure efficient sealing. The air filter cover locates at least partially around the cyclone and at least partially, in particular totally, around the dirt collector. As viewed in the direction of the longitudinal axis of the cyclones, the dirt collector is disposed between the air filter cover and the cyclones.

Advantageously, the main bodies of the cyclones are approximately cylindrical, in particular slightly conical. Opting for a slightly conical design will facilitate mold release of the main body after the injection molding process. An advantageous arrangement can be obtained if the longitudinal axes of the cyclones extend parallel with one another and form a plane. By reference to the direction of gravitational force, the intake elements specifically draw in combustion air from above the carburetor. In this region, the air is charged with a low proportion of particles, which means that the main flow leaving the cyclones contains few particles, ensuring that the air filter will have a long service life. In one particularly advantageous embodiment, the intake system proposed by the invention is used in a disc grinder.

BRIEF DESCRIPTION OF THE DRAWINGS

Other features will become clear from the following description and the exemplary embodiment illustrated in the accompanying schematic drawings, in which.

DESCRIPTION OF PREFERRED EMBODIMENTS

Figure 1:
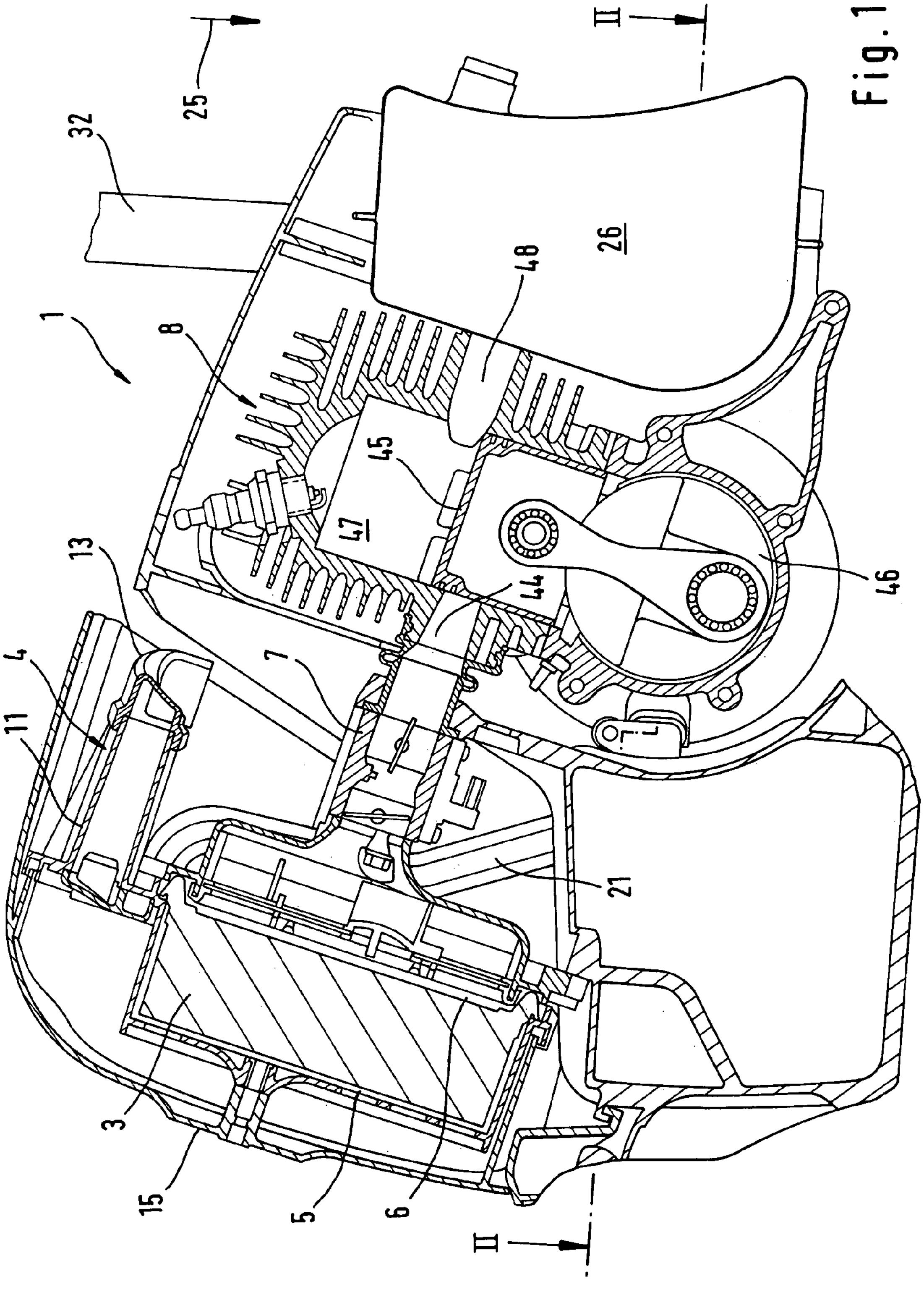
FIG. 1 is a schematic diagram showing a cutaway view in section through a disc cutter.
Figure 4:
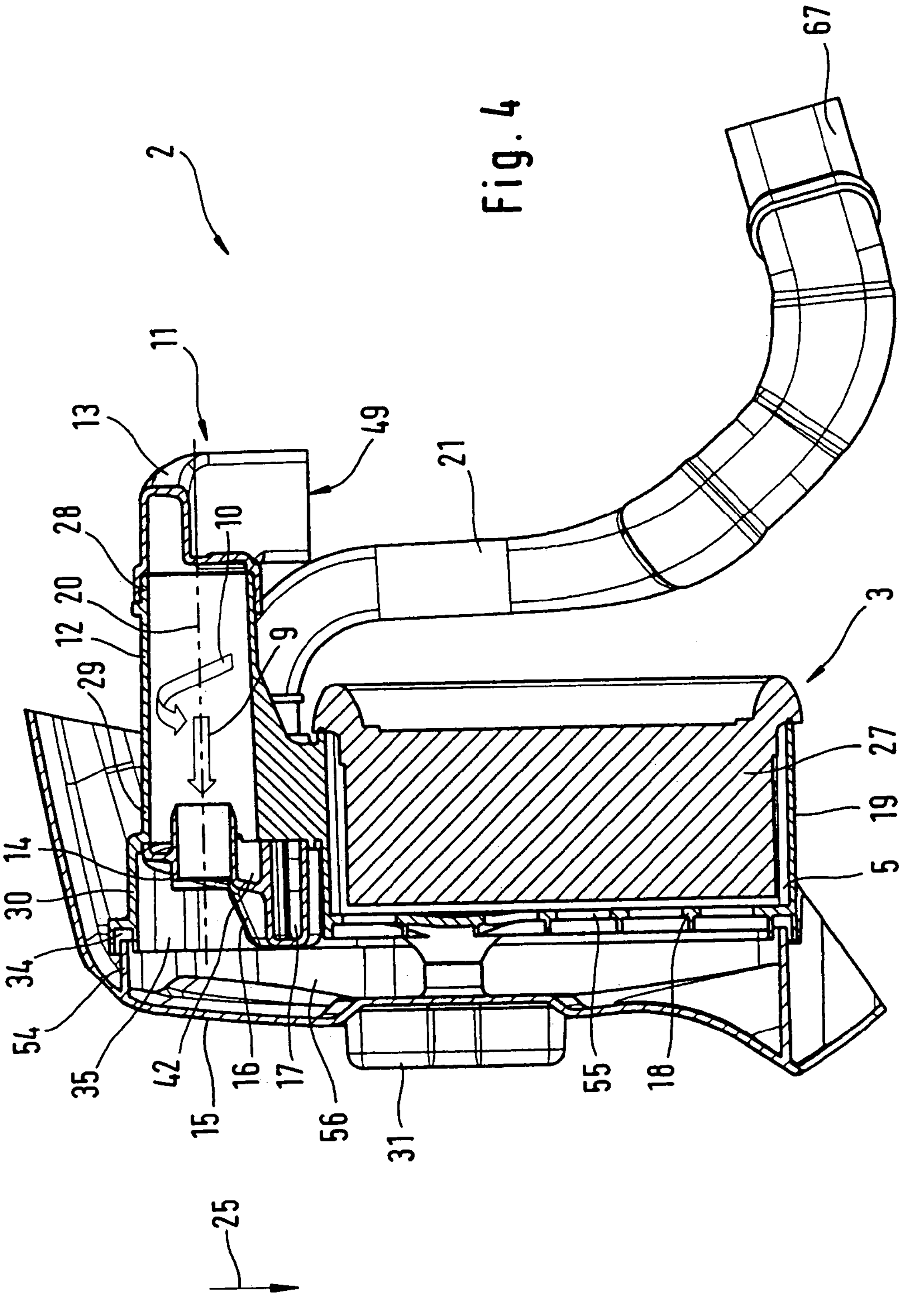
FIG. 4 is a section through the intake system illustrated in FIG. 3.

FIG. 1 is a cutaway view in longitudinal section illustrating a portable, hand-held power tool, namely a cut-off machine or disc grinder 1. The disc grinder 1 has a motor 8, which drives the cutting disc 43 shown in section in FIG. 2. The motor 8 is supplied with a fuel/air mixture via the carburetor 7. The fuel/air mixture is admitted to the motor 8 in the region of the top dead center position of the piston 45 via an inlet 44 into the crankcase 46. After combustion, the exhaust gases leave the combustion chamber 47 via the outlet 48, which opens into the exhaust muffler 26. Upstream of the carburetor 7 and disposed in the flow path is an air filter 3. The clean chamber 6 downstream of the air filter 3 is connected to the carburetor 7. The dirt chamber 5 upstream of the air filter 3 is linked by a flow-connection to a centrifugal separator 4. The dirt chamber 5 is separated from the clean chamber 6 by a filter medium 27 disposed in an air filter housing 19 (FIG. 4).

The centrifugal separator 4 has at least two, in particular at least three, cyclones 11, one of which is illustrated in section in FIG. 1. The cyclones are of a tangential cyclone design, i.e. the inlet to the cyclone is essentially at a tangent to the circumference of the cyclone. However, it may be of advantage to use axial cyclones. The inlet to the cyclone 11 is disposed in an intake element 13. The intake element 13 sucks or draws in combustion airfrom a region between the air filter 3 and the motor 8, which region lies above the carburetor 7 by reference to the direction 25 of gravitational force.

Figure 2:
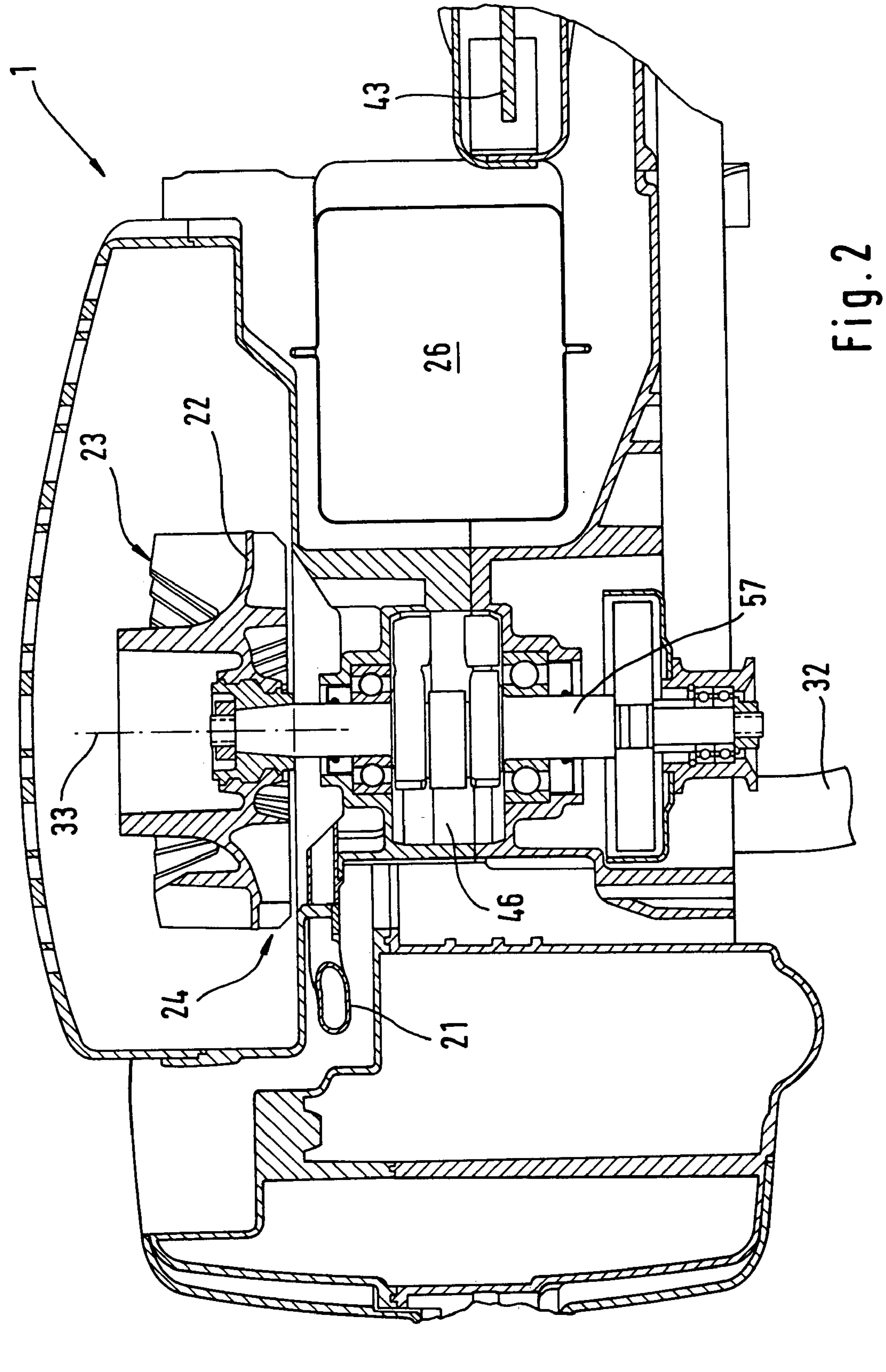
FIG. 2 is a schematic diagram showing a section along line II—II indicated in FIG. 1.

As illustrated in the section shown in FIG. 2, a fan 22 is provided at one end of the crankshaft 57 of the motor 8. The fan 22 has blades both on the front face 23 remote from the motor 8 and on the rear face 24 directed towards the motor 8. The purpose of the fan 22 is to generate a cool airflow to cool the motor 8. Opening onto the rear face 24 of the fan 22 is a discharge pipe or suction tube 21, which is connected to the centrifugal separator 4. The suction tube 21 opens onto a suction area at the rear face 24 of the fan 22. The orifice of the suction tube 21 is expediently disposed in the region of the rotation axis 33 of the fan 22. A substantially pointed opening orifice of the suction tube 21 is advantageous. The orifice may have an aperture which widens the small cross-section of the pointed outlet towards the fan 22. As a result, the pointed flow is distributed uniformly around the circumference in the region of the rotation axis of the fan.

In order to operate the disc grinder 1, a handle 32 is provided, partially illustrated in FIGS. 1 and 2, which spans the disc grinder 1 when in the normal operating position illustrated.

Figure 3:
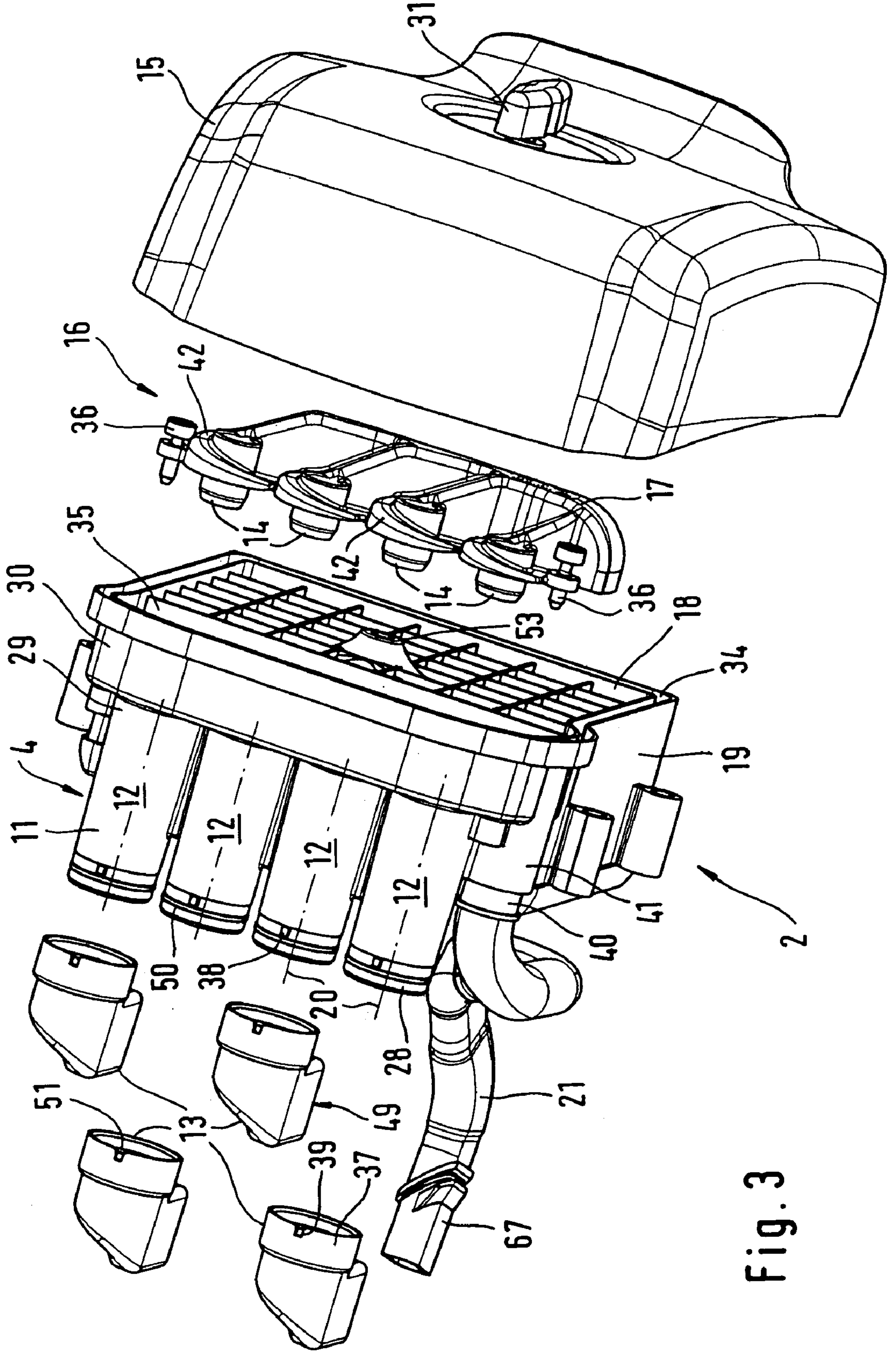
FIG. 3 is an exploded diagram of an intake system.

FIG. 3 is an exploded diagram of the intake system 2, which incorporates the air filter 3 and the centrifugal separator 4. The centrifugal separator 4 has four cyclones 11, each of which consists of a main body 12, an intake element 13, an immersion tube 14 and a discharge screw or spiral 42. The four cyclones 11 are disposed parallel with one another in the airflow and form a cyclone battery. The intake elements 13 are each made as a single piece. A separate intake element 13 is provided for each cyclone 11. The intake elements 13 each have a cyclone inlet 49 through which the combustion air is drawn into the cyclone 11. The cyclone inlet 49 extends substantially at a tangent to the circumference of the main body 12 of the cyclone 11. At the end directed towards the main body 12, the intake elements 13 each have a collar 37, the circumference of which is bigger than the main body 12. By means of the collar 37, the intake element 13 locates over the end 28 of the main body 12 of the cyclone 11 directed towards the intake element. The collar 37 has a slot 39, which co-operates with a matching nose 38 on the main body 12. Provided at the end 28 of the main body 12 is a continuous raised area 50, which locates in a continuous groove 51 provided on the internal periphery of the intake elements 13. In the located position, the nose 38 sits in the slot 39. However, the intake elements 13 may be fixed to the main bodies 12 by any other method, for example by welding, bonding or by screws. The intake elements may also be made as an integral part of the main body 12.

The main bodies 12 of the cyclones 11 are approximately cylindrical, in particular slightly conical in design, the cone advantageously tapering towards the intake elements 13. The longitudinal axes 20 of the cyclones 11 extend parallel with one another and in particular lie in a common plane. At the end 29 remote from the intake element 13, the main bodies 12 are fixed to a first housing part 18 of the air filter housing 19. The main bodies 12 form a common unit with the air filter housing 19. In particular, they are designed as an integral part of the first housing part 18 of the air filter housing 19. The end 40 of the suction tube 21 is fixed to a discharge or suction section 41 in the region of the main bodies 12 of the cyclones 11. The discharge section 41 is disposed in the first housing part 18 of the air filter housing 19. The discharge section 41 advantageously extends substantially parallel with the cyclone bodies 12. However, the direction of flow is the opposite of that through the cyclones 11. The cross-section of the suction tube 21 decreases from the end 40 to the end 67 directed towards the fan 22. As illustrated in FIG. 4, the suction tube 21 coincides with the direction 25 of gravitational force in a region between its ends 40, 67 when the power tool is in its normal operating position.

In the first housing part 18 of the air filter housing 19, a continuous sealing groove 34 is provided on the face remote from the main bodies 12 of the cyclones 11. A seating 35 for a dirt collector 16 is provided inside the sealing groove 34. The dirt collector 16 is attached to the first housing part 18 of the air filter housing 19 by means of fixing screws 36. However, the dirt collector 16 may also be connected to the first housing part by any other type of connection, for example by a bonded or welded joint. The dirt collector 16 may also be joined to the first housing part 18 by a snap-in connection. As illustrated in the section of FIG. 4, the dirt collector 16 sits entirely in the seating or receiving means 35. The immersion tubes 14 provided on the dirt collector 16 therefore project respectively into a main body 12 of a cyclone 11. The discharge spiral 42 provided on the outer periphery of each immersion tube 14 sits in a tight seal against the main body 12 of the respective cyclone 11. As illustrated in FIG. 3, the discharge spirals 42 open into a dirt collection chamber 17 in the dirt collector 16. The dirt collection chamber 17 extends substantially transversely to the longitudinal axis 20 of the cyclones. In particular, the dirt collection chamber 17 extends substantially parallel with the plane formed by the longitudinal axes 20 of the cyclones 11. An air filter cover 15 is removably screwed by a butterfly screw 31 in the screw mount 53 provided in the first housing part 18 of the air filter housing 19.

As illustrated in FIG. 4, when the air filter cover 15 is tightly screwed on, a rim 54 integral with the air filter cover 15 projects into the sealing groove 34 provided on the first housing part 18 of the air filter housing 19. As a result, the dirt chamber 5 upstream of the air filter 3 is sealed off from the outside environment. One or more resilient sealing elements may be arranged in the sealing groove 34 to improve the seal. The filter medium 27 disposed in the air filter 3 is sealed off from the air filter housing 19 so that a flow connection via the filter medium 27 exists only between the clean chamber 6 and dirt chamber 5. Orifices or openings 55 are provided in the first housing part 18 of the air filter housing 19 through which a flow connection is established from the filter medium 27 to the interior 56 of the air filter cover 15 and hence to the centrifugal separator 4 opening into the interior 56.

The dirt collector 16 is disposed in the seating 35 so that a rim 30 of the first housing part 18 of the air filter housing 19 extends around it. The rim 30 is an integral part of the cyclone main bodies 12 and the first housing part 18. As viewed in the direction of the longitudinal axis 20 of the cyclone 11, the dirt collector 16 is disposed between the main body 12 of the cyclones 11 and the air filter cover 15. The air filter cover 15 completely encases the dirt collector 16 in an area outside of the interior 56 closed off by the sealing groove 34 in the direction of the cyclone longitudinal axis 20. The cyclones 11 are also partially encased by the air filter cover 15 in a region of their longitudinal extension.

The combustion air passes through the cyclone inlet 49 into an intake element 13. The radial inlet generates an airflow in the circumferential direction of the cyclone main body 12. As a result of the centrifugal forces, the particles contained in the airflow accumulate in the outer peripheral flow 10. The peripheral flow 10 thus has a higher particle density than the core flow 9 in the interior in the region of the longitudinal axis 20. The core flow 9 passes through the immersion tube 14 out to the interior 56, while the peripheral flow 10 is directed through the discharge spiral 42 to the dirt collection chamber 17. However, it may also be expedient to direct an airflow with a defined particle density out of the peripheral flow to the air filter. From the dirt collection chamber 17, the airflow together with the debris is sucked through the suction tube 21 by the bladed rear face of the fan 22.

Figure 5:
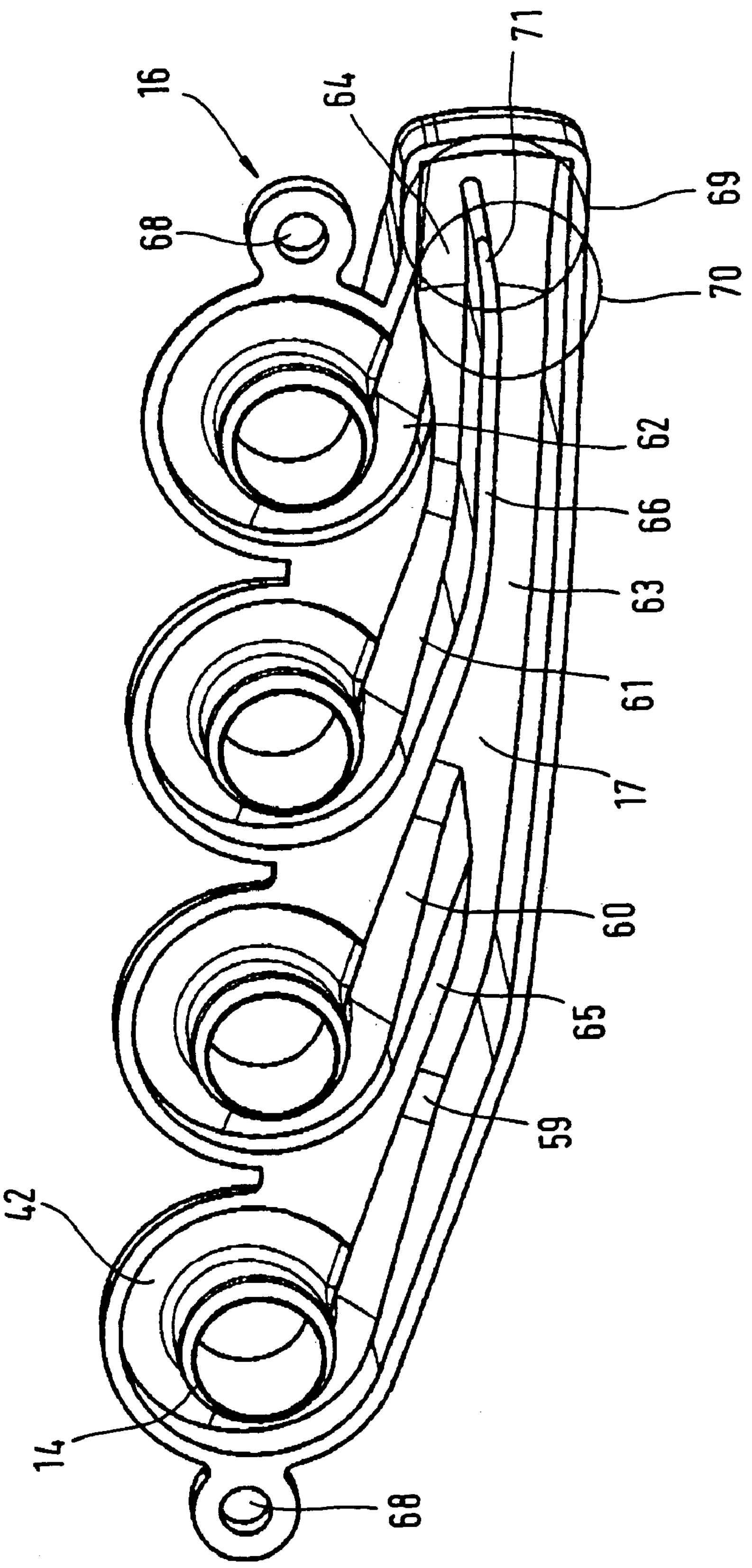
FIG. 5 is a perspective diagram of a dirt collector.

FIG. 5 provides a perspective diagram of a dirt collector 16. Together with the dirt collector 16, the discharge spirals 42 of the four cyclones 11 as well as the immersion tubes 14 of the cyclones 11 are designed as an integral unit. Two fixing orifices 68 are provided in the dirt collector 16, through with the screws 36 illustrated in FIG. 3 extend in order to attach the dirt collector 16 to the housing 19 of the air filter. The peripheral flow 10 containing a high density of particles, illustrated in FIG. 4, flows into the discharge spirals 42 of the cyclones 11. The part-flows flowing into the dirt collector 16 are fed into the dirt collection chamber 17. Accordingly, each part-flow is fed through a passage 59, 60, 61, 62 in the dirt collection chamber 17.

The individual part-flows directed into the passages merge with one another again in pairs in the dirt collection chamber 17. Dividing walls or partitions 65, 66 are duly provided for this purpose. Dividing wall 65 is disposed between the passages 59 and 60 and extends more or less as far as center of the dust collection chamber 17. The part-flows fed into the passages 59 and 60 from two adjacent cyclones 11 therefore merge with one another more or less at the center of the dirt collection chamber 17. Passages 59 and 60 therefore open into a passage 63. The part-flows from the other two adjacent cyclones 11 are directed into the dirt collection chamber 17 through passages 61 and 62, which open into a passage 64 in which the part-flows merge. Passages 61 and 62 are separated by a dividing wall 66, which also separates passage 60 from passage 61. The passages 63 and 64 directing the respective part-flows out from the cyclones merge in the region of the tongue 71, disposed on the dividing wall 66 more or less in the region of the discharge section 69. From the discharge section 69, the airflow is fed into the suction tube 21, the start of which is indicated by the circle 70. The tongue 71 is designed so that the cross-section in passage 64 is smaller than that of passage 63. Passage 61 and passage 64 are separated from passage 63 by the dividing wall 66. The cross-sections of passages 59 to 64 are selected by reference to the respective length of the passages so that a more or less uniform vacuum pressure and mass flow is established at every discharge spiral 42. This ensures that the dirt is efficiently carried out of all the cyclones.

Figure 6:
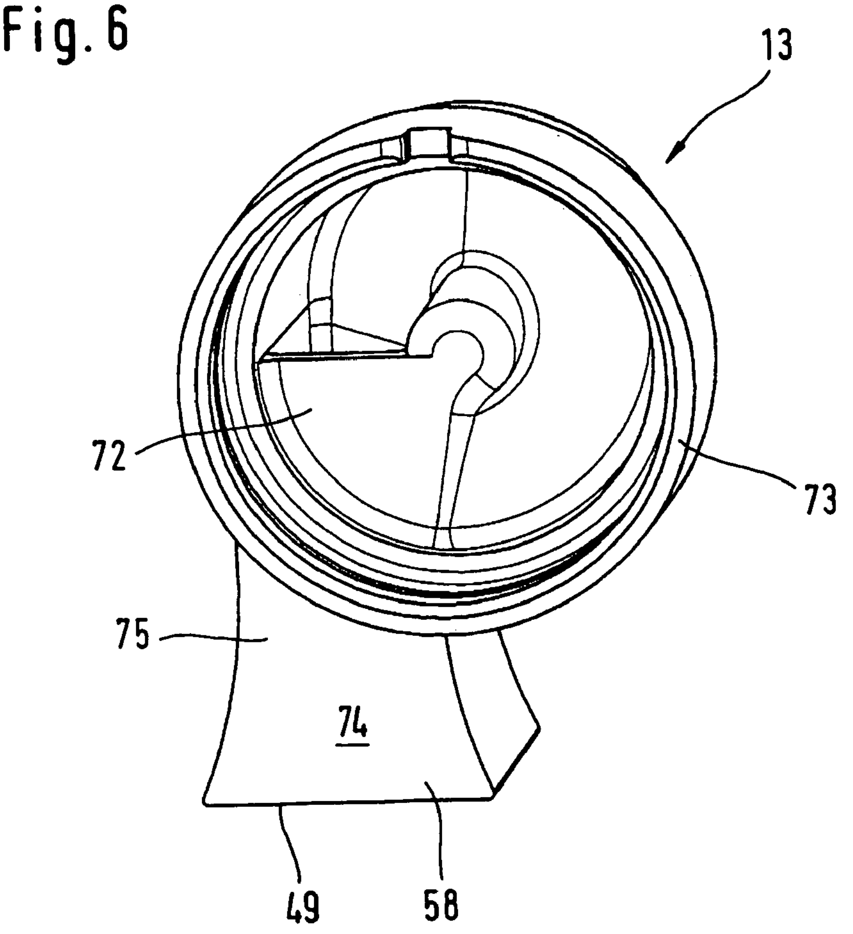
FIG. 6 is a perspective view of an intake element.
Figure 7:
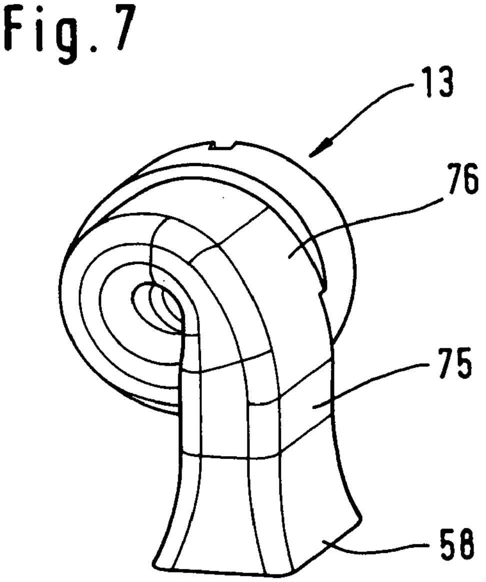
FIG. 7 is a perspective view of another intake element.
Figure 8:
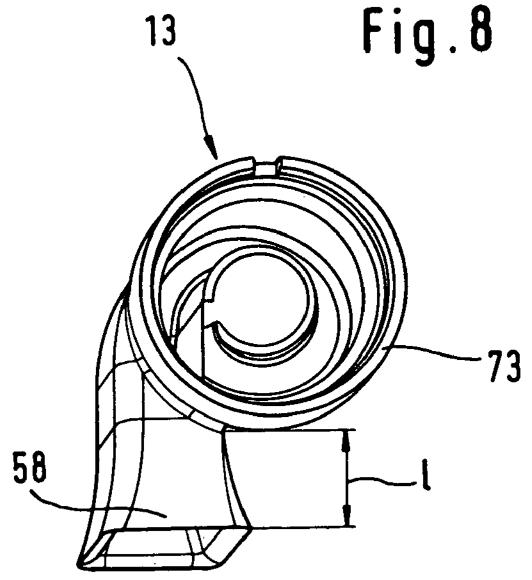
FIG. 8 shows a different perspective view of the intake element illustrated in FIG. 7.

FIGS. 6 to 8 illustrate exemplary embodiments of intake elements 13. The intake element 13 illustrated in FIG. 6 has an inlet funnel 58 in the region of the inlet orifice 49 through which the airflow is drawn in. A dividing wall 72 is provided in the main body 73 in the region where the intake base or connector 75 opens and forms an extension of the side wall 74 of the intake base 75 directed towards the cyclone main body 12. The dividing wall 72 prevents the airflow from being able to pass out from the intake base 75 directly into an immersion tube 14 located at the opposite end of the cyclone 11. The air drawn in is simultaneously forced into a rotating motion.

FIGS. 7 and 8 illustrate a front and rear view of an intake element 13. The inflow geometry may be tangential to the flat base and/or, as illustrated in FIG. 6, with an axial pitch, in other words in the form of a helix. The additional or alternative embodiment with a radial spiral, in other words radially pitched, may also be of advantage (FIGS. 7 and 8). With these embodiments, the airflow is forced into a rotating motion. It may be of advantage if the cross-section in the intake base 75 decreases more or less up to a region 76. The reduced cross-section will accelerate the flow.

In order to produce efficient separation with a low flow resistance, it is of advantage if a length of the intake base 75 is approximately 10 mm. The length l of the intake base is the area more or less up to the periphery of the main body 12 of the cyclone, as indicated in FIG. 8. The length in the cyclone inlet 49 is expediently twice the width in the cyclone inlet. This imparts sufficient impetus to the flow to produce efficient separation.

The immersion tubes 14 are designed as an integral part of the dirt collector 16, and are so in particular for all cyclones 11. However, it may be more practical instead to provide individual covers which enclose the immersion tube and/or discharge spiral. The intake elements 13 are expediently joined to the main bodies 12 of the cyclones in a push-fit connection. All the intake elements 13 are specifically of the same design. As illustrated in FIG. 4, the dirt collection chamber 17 is disposed substantially above the air filter 3 by reference to the direction 25 of gravitational force. In particular, the dirt collector 16 is entirely disposed above the air filter 3. The cyclones 11 are also disposed above the air filter 3, as illustrated in FIG. 4.

The specification incorporates by reference the disclosure of German priority document DE 102 35 761.7 filed Aug. 5, 2002.

The present invention is, of course, in no way restricted to the specific disclosure of the specification and drawings, but also encompasses any modifications within the scope of the appended claims.

What is claimed is:

1. An intake system for the combustion air of a motor of a hand held implement, comprising:

an air filter having a dirt chamber and a clean chamber that is separated from the dirt chamber by a filter medium, wherein said clean chamber is fluidically connected with a carburetor of said motor;

a centrifugal separator that splits an incoming air stream into core flows having a low particle density, and peripheral flows having a high particle density, wherein one of said flows is conveyed to said dirt chamber of said air filter, and the other of said flows is discharged, wherein said centrifugal separator includes at least two cyclones, and wherein discharge flows from said cyclones are respectively combined in pairs; and a common suction tube, wherein said paired discharge flows open out into said suction tube.

2. An intake system according to claim 1, which includes a dirt collector in which is formed a dirt collection chamber into which said discharge flows open out.

3. An intake system according to claim 2, wherein passages are formed in said dirt collection chamber and in which said discharge flows are combined, and wherein at least one partition is disposed between two of said passages.

4. An intake system according to claim 3, wherein said cyclones are provided with discharge spirals, wherein one of said discharge flows is withdrawn from one of said cyclones via a pertaining one of said discharge spirals, and wherein a cross section and length of said passages are such that approximately the same underpressure exists in said discharge spirals of all of said cyclones.

5. An intake system according to claim 4, wherein said discharge spirals of said cyclones are monolithically formed with said dirt collector.

6. An intake system according to claim 2, wherein said dirt collection chamber is fluidically connected with said peripheral flows that are flowing from said cyclones.

7. An intake system according to claim 2, wherein at least one of said cyclones has a main body and an immersion tube, wherein said immersion tube is formed on an end of said main body that faces away from an intake element, and wherein at least one of said core flows flows out of said at least one cyclone via said immersion tube.

8. An intake system according to claim 7, wherein all of said cyclones are provided with immersion tubes, which are monolithically formed with said dirt collector.

9. An intake system according to claim 2, wherein said dirt collection chamber extends essentially perpendicular to longitudinal axes of said cyclones.

10. An intake system according to claim 1, wherein each of said cyclones is provided with a main body on which is disposed an intake element.

11. An intake system according to claim 10, wherein said intake elements are embodied as separate components, and are provided with an inlet funnel.

12. An intake system according to claim 10, wherein said intake elements for all of said cyclones have an identical design.

13. An intake system according to claim 10, wherein said air filter is disposed in an air filter housing, wherein said main bodies of said cyclones form a common component with a first housing part of said air filter housing, and wherein said first housing part includes said dirt chamber of said air filter.

14. An intake system according to claim 2, which includes a fan, wherein said suction tube fluidically connects said dirt collection chamberwith a bladed, rear face of said fan that faces said motor, wherein a cross-section of said suction tube is preferably enlarged in a direction toward said fan, and wherein said suction tube opens out at said fan, approximately in a region of an axis of rotation thereof, such that in a normal operating position of the implement, said suction tube approximately coincides with a direction of gravitational force.

15. An intake system according to claim 2, wherein in a normal operating position of the implement, said dirt collection chamber, when viewed in a direction of gravitational force, is disposed above said air filter.

16. An intake system according to claim 2, wherein said dirt collector is disposed on a housing part of an air filter housing.

17. An intake system according to claim 1, wherein said dirt chamber of said air filter is closed oft relative to the environment via an air filter cover that at least partially spans said cyclones.

18. An intake system according to claim 1, wherein said cyclones are tangential cyclones.

19. An intake system according to claim 1, wherein each of said cyclones has a main body having an approximately cylindrical, or slightly conical, configuration, and wherein longitudinal axes of said cyclones extend parallel to one another and form a common plane.

20. An intake system according to claim 10, wherein relative to a direction of gravitational force, said intake elements draw in combustion air from above said carburetor of said motor.

* * * * *